(12) United States Patent
Gevorgyan et al.

(10) Patent No.: US 8,009,406 B2
(45) Date of Patent: Aug. 30, 2011

(54) CAPACITANCE ARRANGEMENT AND METHOD RELATING THERETO

(75) Inventors: Spartak Gevorgyan, Gothenburg (SE); Anatoli Deleniv, Gothenburg (SE); Per Thomas Lewin, Onsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 358 days.

(21) Appl. No.: 12/444,819

(22) PCT Filed: Oct. 12, 2006

(86) PCT No.: PCT/EP2006/067347
§ 371 (c)(1),
(2), (4) Date: Apr. 8, 2009

(87) PCT Pub. No.: WO2008/043395
PCT Pub. Date: Apr. 17, 2008

(65) Prior Publication Data
US 2010/0006981 A1    Jan. 14, 2010

(51) Int. Cl.
*H01G 4/06* (2006.01)
(52) U.S. Cl. ............ 361/277; 361/278; 361/283.1; 361/283.3; 361/290; 361/292

(58) Field of Classification Search ............ 361/277, 361/272–273, 278–279, 283.1, 283.3, 287, 361/290, 292
See application file for complete search history.

(56) References Cited

U.S. PATENT DOCUMENTS

| | | | |
|---|---|---|---|
| 6,473,290 B2 * | 10/2002 | Mochida | 361/291 |
| 6,556,415 B1 * | 4/2003 | Lee et al. | 361/277 |
| 6,785,117 B2 * | 8/2004 | Sakai et al. | 361/280 |
| 6,897,537 B2 * | 5/2005 | de los Santos | 257/414 |
| 7,372,346 B2 * | 5/2008 | Tilmans et al. | 333/187 |
| 7,505,246 B2 * | 3/2009 | Casset | 361/287 |

* cited by examiner

*Primary Examiner* — Nguyen T Ha

(57) ABSTRACT

A capacitance arrangement comprising at least one parallel-plate capacitor comprising a first electrode means, a dielectric layer and a second electrode means partly overlapping each other. A misalignment limit is given. Said first electrode means comprises a first and a second electrode arranged symmetrically with respect to a longitudinal axis, said first and second electrodes have a respective first edge, which face each other, are linear and parallel such that a gap is defined there between. Said second electrode means comprises a third electrode with a first section and a second section disposed on opposite sides of said gap interconnected by means of an intermediate section, which is delimited by a function depending on a first parameter and a second parameter. One of said two parameters is adapted to be selected hence allowing calculation of the other parameter to determine the shape and size of the second electrode means.

27 Claims, 7 Drawing Sheets

US 8,009,406 B2

CAPACITANCE ARRANGEMENT AND METHOD RELATING THERETO

TECHNICAL FIELD

The present invention relates to a capacitance arrangement which consists of at least one parallel-plate capacitor comprising a first electrode means, a dielectric layer and a second electrode means which are substantially disposed in parallel and on either side of said dielectric layer and which partly overlap each other whereby the equivalent capacitance depends on the size of the overlapping area of said first and second electrode means and wherein a misalignment limit is given defining the maximum allowable extent of misalignment between a respective first and second electrode means. The invention also relates to a method of fabrication of such a capacitance arrangement.

BACKGROUND

It is a well known fact that it is very difficult, or even impossible, to fabricate capacitors which have exactly the desired capacitance, particularly in the case of parallel-plate capacitor arrangements where the overlapping area between a first electrode means and a second electrode means gives the capacitance due to allowable misalignment during the fabrication process. Thus, it is not possible to guarantee that the capacitance will be exactly the desired one; it is only possible to guarantee that it will fall within a range given by an allowable misalignment, i.e. an allowable misalignment limit. This is clearly disadvantageous since in many cases an exactly defined capacitance is needed. A particular case relates to so called varactors, i.e. tunable capacitors. Coplanar plate and parallel plate electrodes are for example considered for applications in phase and frequency agile, i.e. tunable, adaptable, reconfigurable, microwave systems. In comparison with analogue (semiconductor, MEM) varactors, the varactors based on the use of a ferroelectric film have a higher tuning speed, a higher Q(quality)-factor and lower leakage currents, which is very advantageous.

FIG. 1A shows very schematically a coplanar plate varactor arrangement $10_{01}$ wherein two coplanar electrodes $3_{01}$, $3_{01'}$ are deposited on top of a ferroelectric film $2_{01}$ which in turn is disposed on a substrate $1_{01}$. For the varactor arrangement $10_{01}$ of FIG. 1A, for a given ferroelectric film, the capacitance is defined by the shape of the electrodes and the gap width g between the electrodes $3_{01}$, $3_{01'}$. In parallel-plate varactors as shown in FIGS. 1B-1F, the ferroelectric film is instead sandwiched between two electrodes, c.f. FIG. 1B wherein a ferroelectric film $2_{02}$ is disposed between a top electrode $3_{02'}$ and a bottom electrode $3_{02}$ which is disposed on a substrate $1_{02}$. For a given ferroelectric film, the capacitance is defined by the thickness t of the ferroelectric film in the area where the top and the bottom electrodes overlap and by the overlapping area and by the dielectric permittivity of the film.

FIG. 1C shows an alternative implementation of a parallel-plate varactor arrangement wherein a top electrode $3_{03'}$ is disposed on a ferroelectric film $2_{03}$ partly in overlap with a bottom electrode $3_{03}$ disposed on a substrate $1_{03}$. The varactor arrangement $10_{03}$ of FIG. 1C has a capacitance which, for a given ferroelectric film, is given by the overlapping area which is given by the width w×l+Δl, wherein w is the width of the overlapping portion and l+Δl is the length of the overlapping portion.

FIG. 1D shows still another known parallel-plate varactor arrangement $10_{04}$ comprising a substrate $1_{04}$, a top electrode $3_{04'}$ and a bottom electrode $3_{04}$ which are disposed on either sides of a ferroelectric film $2_{04}$ such as to partly overlap. A low permittivity film (with dielectric constant ∈<10) $4_{04}$ is arranged such as to define the overlapping area, the length portion b where there is no such extra film defining the actual relevant portion. A top view of this arrangement is shown in FIG. 1E where it can be seen the width c of the overlapping portion and hence the overlapping area being defined by the opening b×c in the low permittivity film.

In still another parallel-plate arrangement $10_{05}$ comprising a substrate $1_{05}$, dielectric film $2_{05}$ lower and upper electrodes $3_{05}$, $3_{05'}$ an opening is formed in the bottom electrode ($3_{05}$) or alternatively in the top electrode ($3_{05'}$) to define an overlapping area A=b×c.

However, all these known varactor arrangements suffer from drawbacks. For example, varactors with coplanar plate electrodes as shown in FIG. 1A have a simple design but they require application of higher voltages than parallel-plate varactor arrangements, typically the required voltage is above 50-100V. Varactors with parallel-plate electrodes as shown in FIG. 1B-1C do not require such high voltages but typically it is enough with a voltage of 5-20V, but on the other hand it is a disadvantage of such designs that they are sensitive to the alignment of the top and the bottom electrodes during the fabrication process. Normally a ferroelectric film with an extremely high permittivity is used and due to this extremely high permittivity, which typically is above 100, a small disalignment Δl (c.f. FIG. 1C) will result in substantial changes in the capacitance, which make the prediction of the capacitance non-controllable and hence the design of the arrangement will not be cost-effective. The design shown in FIG. 1D, 1E offers a good capacitance prediction but it requires more masks and fabrication processes making them cost ineffective. The arrangement shown in FIG. 1F offers a comparatively good capacitance prediction but it is disadvantageous in so far that extra ohmic losses are associated with strips connecting the leads or pads of the capacitor of the overlapping area of the parallel-plate structure.

SUMMARY

What is needed is therefore a capacitance arrangement for which the capacitance can be predicted to a high extent. Moreover a capacitance arrangement is needed which has a simple design and which still does not require, particularly in the case of a varactor arrangement, high voltages. Most particularly a capacitance arrangement or varactor arrangement is needed which to a high degree is insensitive to any misalignment. Basically a capacitance arrangement or a varactor arrangement is needed through which the capacitance is controllable. Still further a varactor arrangement is needed which is easy and cost efficient to fabricate. Still further such a capacitance arrangement is needed which does not suffer from high ohmic losses due to the design.

In other words, a capacitance arrangement is needed which has low ohmic losses or a high Q-factor associated with the electrodes and which does not require many masks and processing steps hence enabling a cost effective fabrication. Particularly a parallel-plate varactor or capacitance arrangement is needed for which the effective overlap area is not sensitive to any misalignment that may be introduced during the fabrication.

Therefore, a capacitance arrangement as initially referred to is provided wherein a first electrode means comprises a first and a second electrode arranged symmetrically with respect to a longitudinal axis. Said first and second electrodes have a respective first edge, which respective first edges face each other, are linear and parallel such that a gap is defined there between. The second electrode means comprises a third electrode which comprises a first section and a second section disposed on opposite sides of said gap and inter-connected by means of an intermediate section which is delimited by a first curved edge and a second curved edge. Said first and second curved edges are symmetrical and oppositely directed with respect to said longitudinal axis. The shape of said intermediate section is given by a function F(x) which contains a first parameter and a second parameter. One of said parameters is adapted to be selected, allowing calculation of the other parameter such that the capacitance of the capacitance arrangement will be misalignment invariable within the given misalignment limit.

Particularly the said first parameter (k) determines the shape or the curvature of F(x) (and size) and the second parameter (A) is half the width of the second electrode means, i.e. the third electrode. In an advantageous implementation the first parameter k is adapted to be selected allowing calculation of the second parameter A which normally is easier. Of course, the inventive concept also covers the case wherein the second parameter is selected and the first parameter calculated depending on said selection. Particularly the first and second electrodes are adapted to have a shape and to be arranged such that the overlapping area gives a predetermined capacitance independently of any occurring misalignment ($\Delta x$) within the given misalignment limit giving different overlaps in the region of the intermediate section on the side of the first section and of the second section, i.e. the overlapping area will not be symmetric with respect to an axis perpendicular to the longitudinal axis in the middle of the first and second electrode.

Most particularly the capacitance between the first electrode and the third electrode is proportional to the sum of the overlap of the first electrode and the first section of the third electrode, the overlap between the first electrode and the intermediate section in the absence of any misalignment, and the first misalignment overlap area ($\Delta S_1$), wherein the first electrode and the intermediate section in the longitudinal direction limited by the maximum allowed misalignment. The capacitance between the second electrode and the third electrode is proportional to the sum of the overlapping area of the second electrode and the second section of the third electrode, the overlap between the second electrode and the intermediate section in absence of any misalignment and a second misalignment overlapping area ($\Delta S_2$) of the second electrode and the intermediate section in the opposite longitudinal direction limited by the maximum allowed misalignment. Said first and second misalignment overlapping areas have opposite signs, i.e. if the first misalignment overlapping area has a positive sign, the second has a negative sign or vice versa. Particularly said first and second parameters are so selected and calculated respectively that the relationship between the first and the second misalignment overlap areas, $\Delta S_1$, $\Delta S_2$, or between corresponding first and second capacitance differences $\Delta C_1$, $\Delta C_2$, will be such that the equivalent capacitance of the arrangement is independent of any produced misalignment, within the given misalignment limit.

Particularly the first misalignment overlapping area $\Delta S_1$ is equal to the overlapping area of a first section S1 divided by the quotient between the overlapping area of a first section and the second misalignment area, $S1/\Delta S_2$ minus 2, i.e. $\Delta S1 = S1/((S1/\Delta S_2) - 2)$. Particularly the shape of the intermediate section is given by a function $F(x) = A \cdot e^{kx}$, wherein 2A is the width of the second electrode means, i.e. twice the first parameter and k being the first parameter defining the slope or curvature, wherein $0 < x < 2\Delta x_A$, $\Delta x_A$ being the misalignment limit. Particularly half of the width of the second electrode means is $A = -k \cdot S1/(e^{kWg/2})$, wherein S1 is the overlapping area of a first section, Wg being the gap width and k being the parameter determining the slope or curvature of the function delimiting the intermediate section. Particularly the first and second sections are symmetrical. The first and second sections may be square shaped, rectangular, semicircular or partly irregular.

In a most particular implementation a number of capacitors (parallel-plate capacitors or varactors) are connected in series. In one embodiment the second electrode means comprises a bottom electrode and the first electrode means comprises a top electrode, or vice versa. Alternatively the first or the second electrode means may be disposed on a substrate although this is not necessarily the case.

In one embodiment the dielectric material has a low or comparatively low dielectric constant, for example consisting of $SiO_2$ or a material with similar properties, the arrangement being a non-tunable capacitance arrangement. In an alternative embodiment it comprises a varactor arrangement and the dielectric layer comprises a ferroelectric layer with a tunable dielectric constant which preferably is high or very high.

The dielectric layer may then for example comprise a tunable ceramic material such as $SrTiO_3$, BaSTO or a material with similar properties. The electrode means generally consists of a metal such as Au, Ag, Pt, Cu.

The ferroelectric or dielectric material may comprise a thin film, i.e. thin film technology may be implemented. However, the invention is not limited to thin film implementations but the dielectric or ferroelectric layer may also comprise a thick film.

It is an advantage of the invention that circuits, particularly capacitors or varactors, can be fabricated having precisely or accurately defined capacitance values. It is a major advantage that parallel plate capacitors or varactors which are, to a high degree, insensitive to misalignments between the top and bottom electrodes that may be produced during the fabrication process.

BRIEF DESCRIPTION OF THE DRAWINGS

The invention will in the following be further described, in a non-limiting manner, and with reference to the accompanying drawings, in which.

BRIEF DESCRIPTION OF THE DRAWINGS

The FIGS. 1A-1E showing arrangements have been discussed above under the background section and will therefore not be further discussed herein.

According to the present invention the top and/or bottom electrodes are so shaped in relation to each other that the effective overlapping area will be unsensitive to any misalignment (within a predetermined maximum misalignment limit). The arrangements according to the different embodiments can be made as capacitance arrangements or as varactor arrangements, i.e. comprising a tunable capacitor. For the reasons of simplicity will in the following mainly be referred to varactors but it should be clear that it may just as well be capacitors, the difference lying in the dielectric constant of the thin or thick film on either sides of which first and second electrode means are disposed.

Figure 1A:
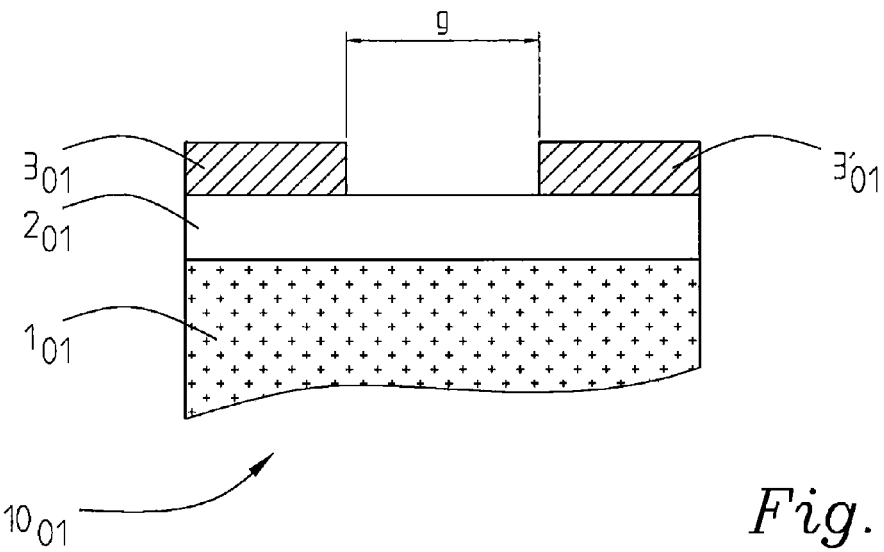
FIG. 1A schematically shows a state of the art capacitor/varactor arrangement of the coplanar type, FIG. 1B schematically illustrates a first parallel-plate varactor or capacitor arrangement according to the state of the art.
Figure 1B:
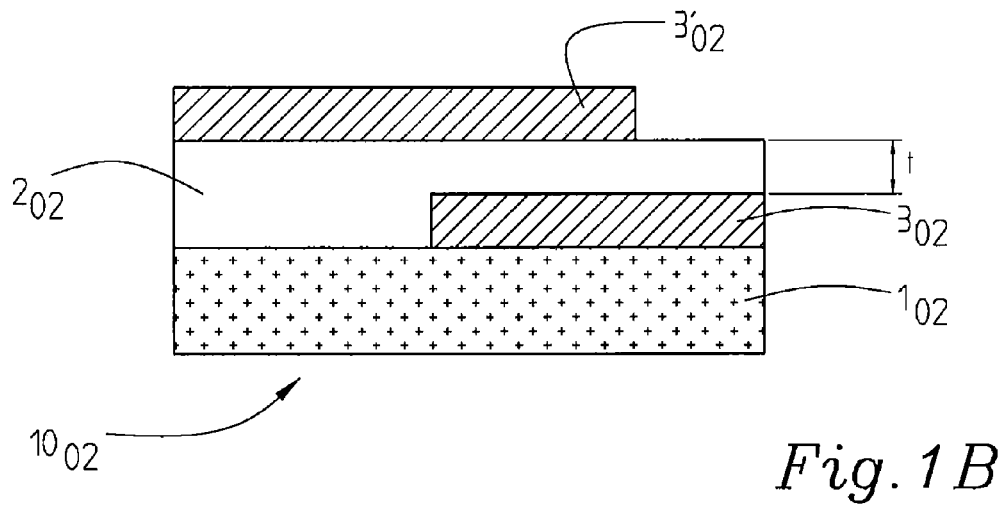
FIG. 1C shows another example of a state of the art parallel-plate capacitor or varactor arrangement.
FIG. 1D is a cross-sectional, schematical view of still another state of the art parallel-plate capacitor/varactor arrangement.
FIG. 1E is a top view of the parallel-plate varactor arrangement of FIG. 1D.
FIG. 1F shows still another parallel-plate capacitor/varactor arrangement according to the state of the art.
Figure 1C:
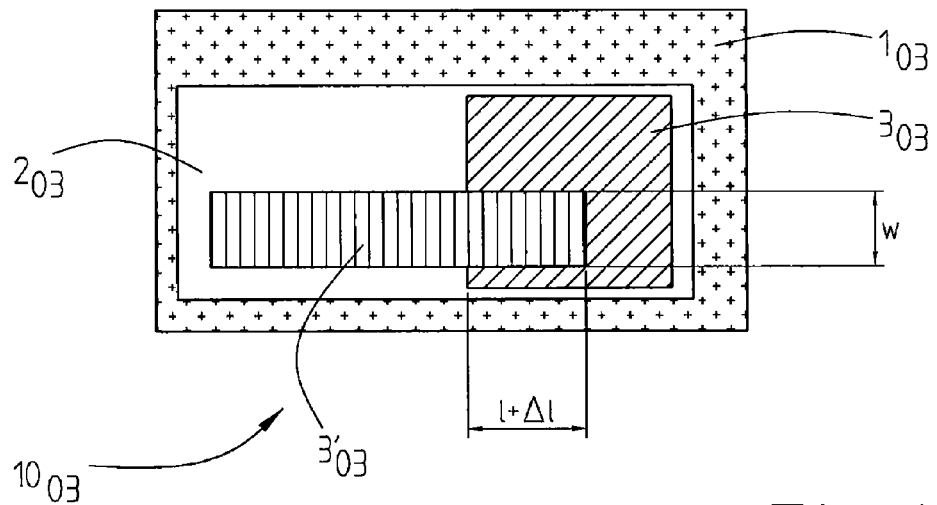
Figure 1D:
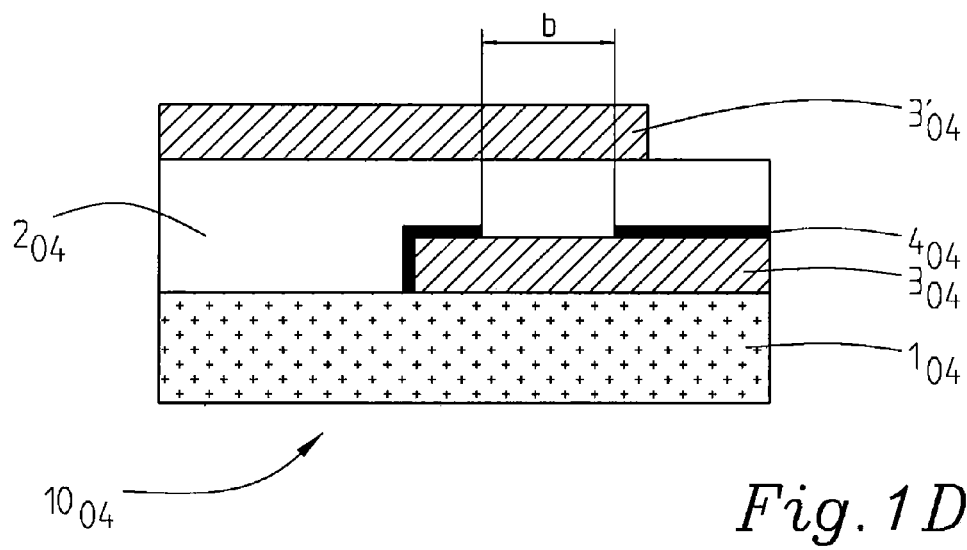
Figure 1E:
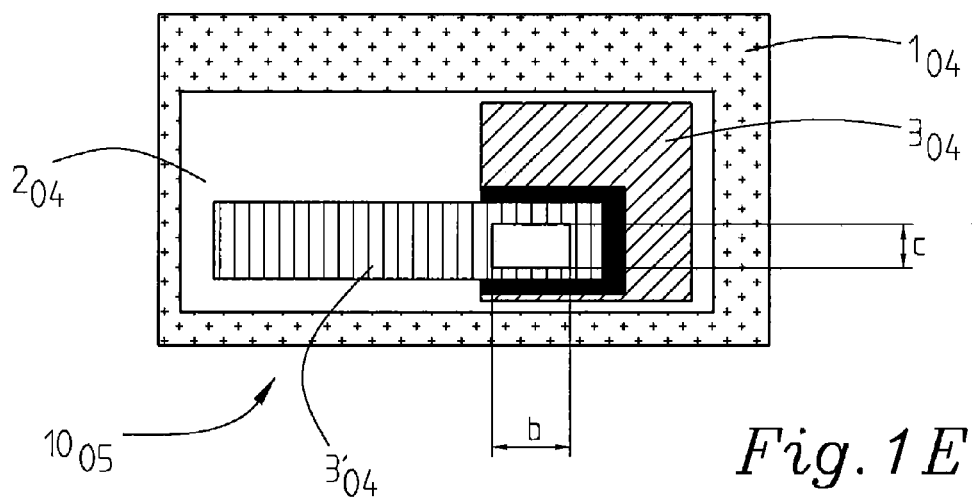
Figure 1F:
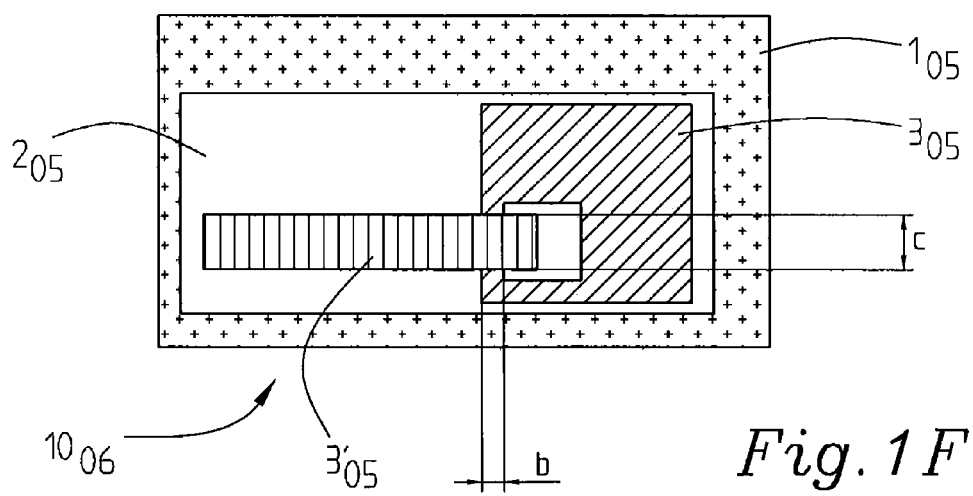
Figure 2:
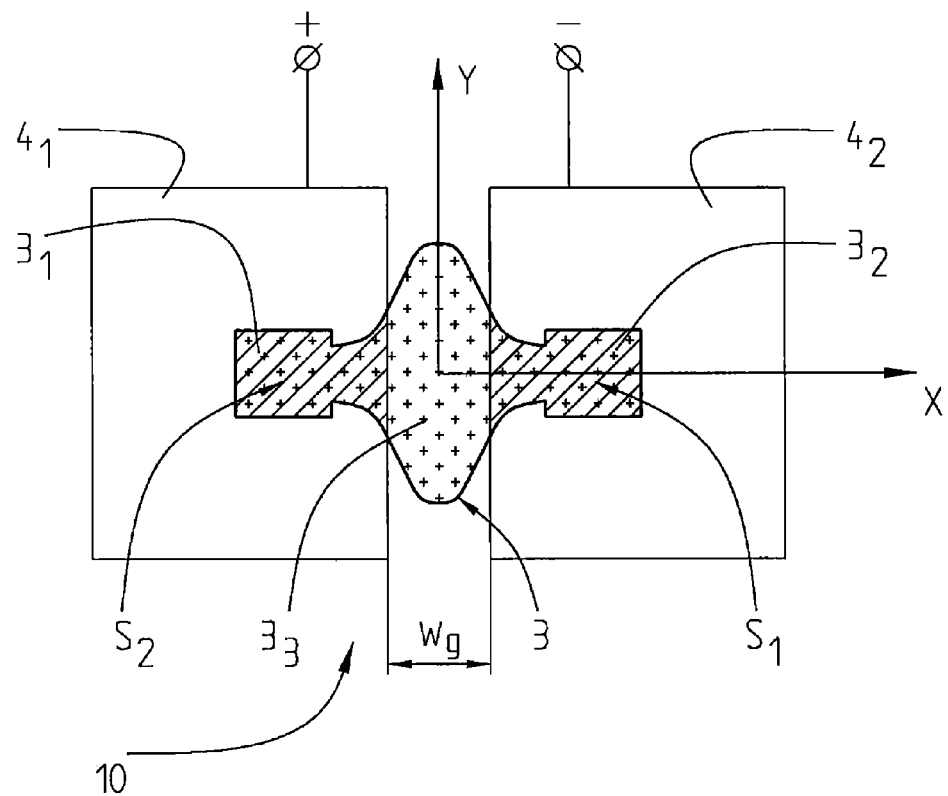
FIG. 2 illustrates a first embodiment of a capacitor/varactor arrangement according to the present invention when there is no misalignment between the first and the second electrode means.
Figure 2A:
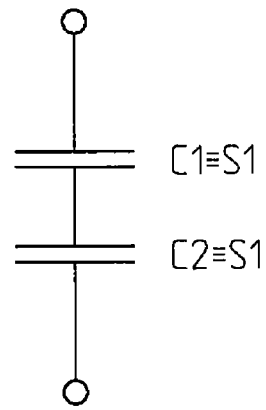
FIG. 2A is a simplified circuit representation of the arrangement of FIG. 2.

FIG. 2 shows a first embodiment of a varactor arrangement 10 according to the present invention. In FIG. 2 the lay-out is presented for a case where there actually is no misalignment between the electrodes on either sides of the ferroelectric layer. A first electrode means comprising a first electrode $4_1$ and a second electrode $4_2$ are disposed on a thin ferroelectric film (not shown in the figure). It is here supposed that the first and second electrodes $4_1$, $4_2$ are rectangular or square shaped and disposed symmetrically with respect to a longitudinal axis x such that a gap of a width $w_g$ is provided between them. They are hence symmetrically located both with respect to the longitudinal axis x and to an axis y perpendicular to the axis x and parallel with the longitudinal extension of the gap. Since there is no misalignment this axis y is supposed to be in the middle of the gap. On the other side of the ferroelectric film a second electrode means comprising a third electrode 3 is disposed. It comprises a first electrode section $3_1$ and a second electrode section $3_2$ which have the same shape and which here also are supposed to be symmetrically disposed with respect to the longitudinal axis x. In this particular embodiment they are supposed to be square shaped but they may have substantially any shape as will be shown below. An intermediate section $3_3$ interconnects said first and second sections $3_1$, $3_2$. The shape of the intermediate section $3_3$ is determined by a function F(x) which is to be appropriately established as will be more thoroughly described below. The equivalent capacitance of the arrangement is given by the overlapping areas which here are the same, i.e. the part of the first and second electrodes $4_1$, $4_2$ overlapping first and second sections $3_1$, $3_2$ of the second electrode means and, since there is no misalignment, the symmetrical and identical overlapping areas of the intermediate section 33 and the first and second electrodes $4_1$, $4_2$. Thus, in FIG. 2 two metallized interfaces comprising the first and second electrode means $4_1$, $4_2$, 3 are precisely aligned forming the varactor 10, established by a series connection of two similar varactors, c.f. FIG. 2A, due to two overlapping areas S1, S2 which here are similar. Each varactor has a nominal capacitance $$C1' = C2' = \frac{\varepsilon_r \varepsilon_0 S1}{h} \equiv C1$$

wherein S1 denotes the respective overlapping areas, and h the thickness of the ferroelectric film in the overlapping area.

FIG. 2A is a simplified circuit representation of a first varactor comprising the varactor formed by the overlapping area between the first electrode $4_1$ and the first section $3_1$ of the third electrode 3 and part of the intermediate section $3_3$ connected to the first section $3_1$ identical to the area S1 and correspondingly C2 is the capacitance of the varactor formed by the second electrode $4_2$ and the second section $3_2$ and the corresponding part of the intermediate section $3_3$ connected to said second section. In this case they are identical.

Figure 3:
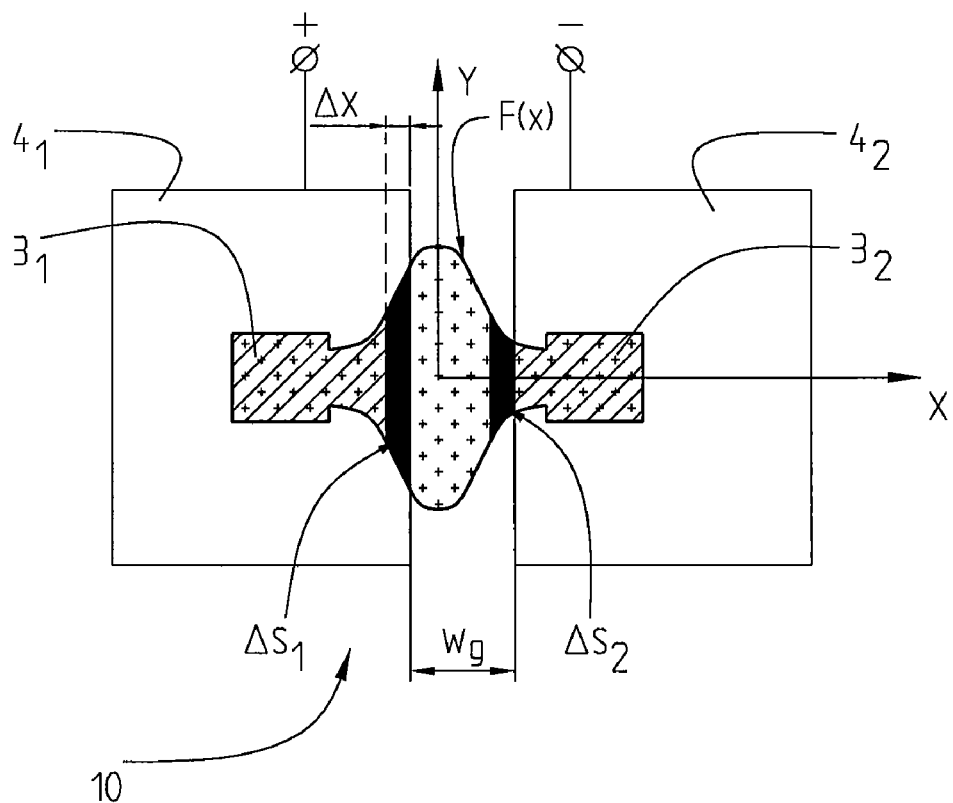
FIG. 3 illustrates a capacitor/varactor arrangement as in FIG. 2 but where there has been a misalignment between first and second electrode means.
Figure 3A:
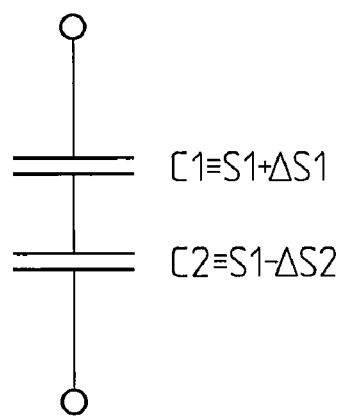
FIG. 3A is a simplified circuit representation of the misalignment arrangement of FIG. 3, FIG. 4 schematically illustrates an alternative embodiment a capacitor/varactor arrangement according to the invention.

FIG. 3 shows the topology of the same arrangement as in FIG. 2 but where there is a misalignment $\Delta x$ between the first and the second electrode means. As can be seen from the figure, the effect of the misalignment will differ for the two varactors. In the figure $\Delta x$ illustrates the misalignment. As can be seen the first electrode means comprising the electrodes $4_1$ and $4_2$ has been displaced a distance $\Delta x$ on the longitudinal axis x. The misalignment area also called the capacitance area of the first varactor is increased, the increase being indicated $\Delta S1$ in the figure, and $C1 \equiv S1 + \Delta S1$. For the other varactor, on the other hand, the capacitance is decreased by $\Delta C2$, i.e. $C2 \equiv S1 - \Delta S2$, which means that for the first varactor, in this case, the capacitance is increased whereas it for the other is decreased. In the figure $\Delta S1$ indicates the misalignment area for the first varactor and $\Delta S2$ indicates the misalignment area for the second varactor. Generally $\Delta S1$ is not equal to $\Delta S2$. The total capacitance C of the two varactors is $1/C=1/C1+1/C2$. According to the present invention the relationship between $\Delta C1$ and $\Delta C2$ is established so that the total capacitance or equivalent capacitance of the misalignment capacitor is the same as the total capacitance without misalignment, i.e. it should be the same for the varactor arrangement of FIG. 2 as for the varactor arrangement of FIG. 3. The formula above can be written:

$$\frac{S1}{2} = \frac{(S1 + \Delta S1) \times (S1 - \Delta S2)}{(S1 + \Delta S1) + (S1 - \Delta S2)}$$

which can be simplified to $\Delta S1 = S1/((S1/\Delta S2)-2)$.

This gives the relationship between $\Delta S1$ and $\Delta S2$ that is needed for the varactor arrangement of FIG. 2 and FIG. 3 to have the same or similar total area capacitance $S1/2$. This relationship can be used to find a function F(x) defining the shape of the electrodes. In general the function may be represented by different shapes, and assume different forms. Here one example of a function is given as $S(x)=Ae^{kx}$, wherein $0<x<2\times\Delta x_A$, $\Delta x$ being the maximum misalignment of the metallic interfaces or between the first and the second electrode means. $\Delta S1$ and $\Delta S2$ can then be specified in an analytic form as:

$$\Delta S1 = A(e^{k(Wg/2+\Delta x)} - e^{k(Wg/2)})/k \text{ and } \Delta S2 = A(e^{kWg/2} - e^{k(Wg/2-\Delta x)})/k.$$

S1 can then be obtained as $S1 = -2Ae^{kWg/2}/k$.

It should be noted that in the last formula there is no dependence on $\Delta x$, i.e. on the misalignment. This actually means that by properly establishing A and k a thoroughly misalignment independent capacitance can be obtained, i.e. a varactor for which the capacitance is independent with respect to any misalignment of the first and second electrode means. Properly here means that the last formula (S1=2A $(e^{kWg/2})/k$) is satisfied.

As can be seen there are two different parameters, A and k, which means that one of them can be selected as independent. Generally it is most convenient to select the value for k, since A then can be calculated analytically as:

$$A=-kS1/(2e^{kWg/2})$$

If instead A is selected a transcendental equation with respect to k has to be solved. 2A corresponds to the width of the second electrode means.

In the following an example will be given describing the designing of the shape of the electrodes in the range of a possible maximum misalignment such that the capacitance will be completely misalignment independent. First, it is here supposed that a value of k is selected which is such that the widths of the electrodes (A) is reasonable. Subsequently the area of the electrodes is adjusted so that the desired capacitance given S1 is obtained. In a particular embodiment it is supposed that an alignment invariant capacitance is designed which has an equivalent area of 25 µm². It is supposed that the gap between the electrodes is 4 µm and the possible misalignment is +/−2 µm. k is here then selected to be −0.49/$w_g$, which gives A=5 µm. A program can be used to plot the shape of the electrodes and FIG. 7 shows a symmetric quarter of an electrode structure obtained with the above figures.

Figure 7:
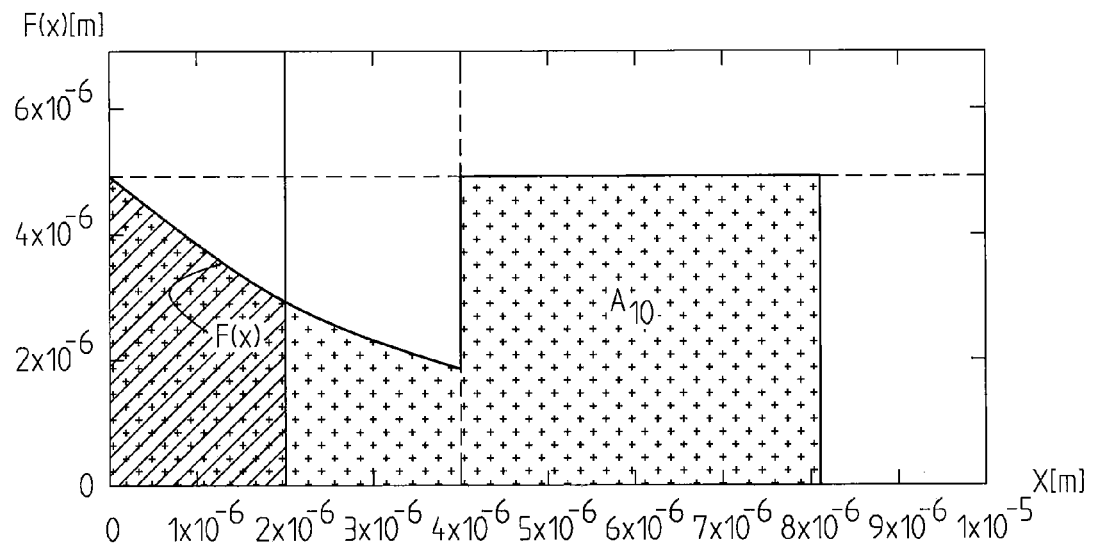
FIG. 7 illustrates an example of a quarter of an electrode structure obtained for a misalignment invariant varactor according to the invention.
Figure 8:
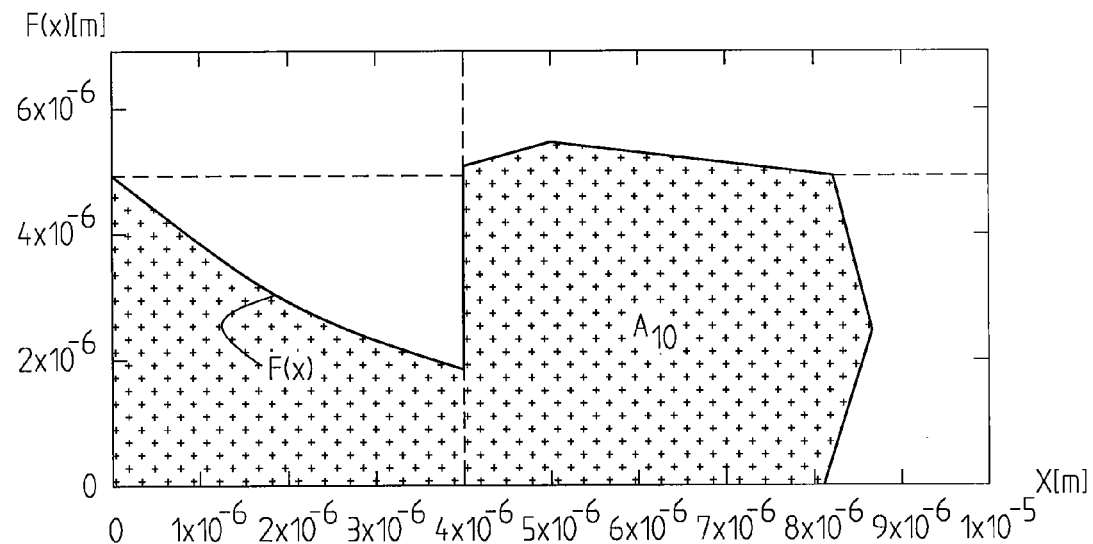
FIG. 8 shows an alternative example of an electrode structure (a quarter) obtained for a misalignment varactor according to another implementation.

FIG. 8 is a figure similar to FIG. 7 for another design where the electrodes or particularly the first and second electrodes sections of the second electrodes means are of a more general shape instead of rectangular though their areas are similar.

Figure 4:
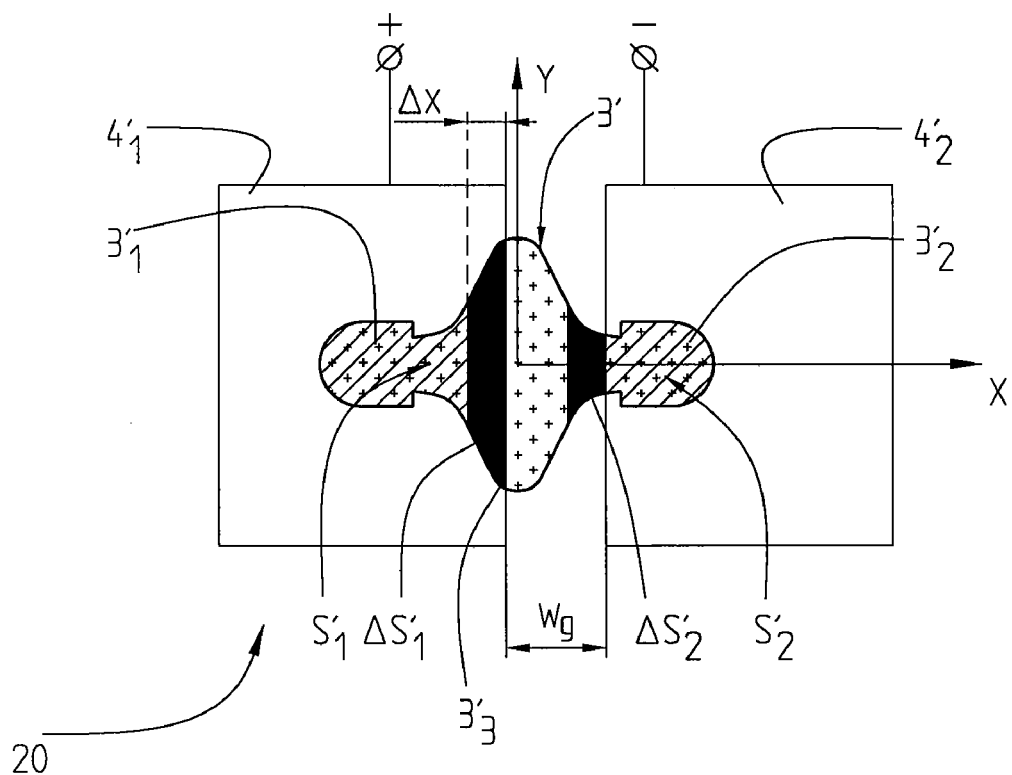

FIG. 4 is a figure similar to FIG. 3 showing a varactor arrangement 20 where a second electrode means 3' comprising a first electrode section $3_1$' and a second electrode section $3_2$' connected by an intermediate section $3_3$' arranged on a substrate 1' on top of which of a dielectrical ferroelectric film is arranged, upon which a first electrode means comprising a first electrode $4_1$' and a second electrode $4_2$' is disposed such that an overlap is given corresponding to S1'+ΔS1' and S2'−ΔS2' respectively. However, since there is a misalignment present, Δx, the misalignment areas $ΔS_1$' and $ΔS_2$' are not the same (cf. FIG. 3). The difference actually here is that the first and second electrode sections $3_1$', $3_2$' are substantially semicircular, or have an oval shape.

Figure 5:
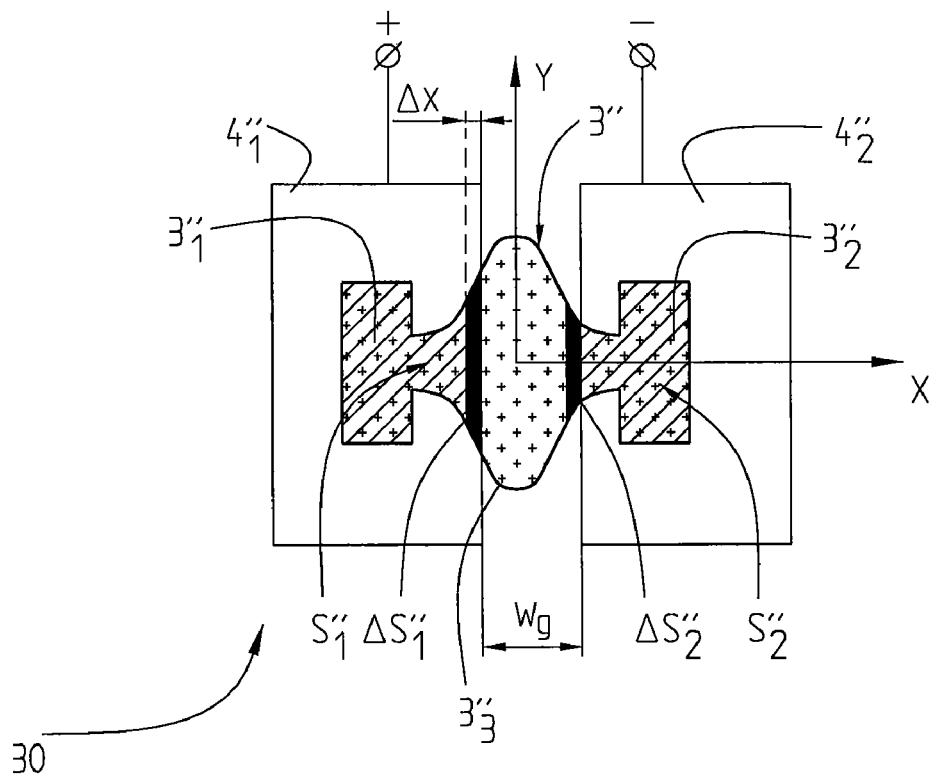
FIG. 5 shows very schematically still another embodiment of a varactor arrangement according to the invention, FIG. 6 very schematically illustrates an arrangement according to the invention with varactors connected in series.

FIG. 5 shows still another embodiment of a varactor arrangement 30 wherein a second electrode means comprising a first electrode section $3_1$" and a second electrode section $3_2$" interconnected by means of a intermediate section $3_3$" is disposed on a substrate arranged such as to provide an overlap with a first electrode means comprising a first and a second electrode $4_1$", $4_2$" which sections are rectangular and arranged as the structure in FIG. 2, i.e. symmetrically along a longitudinal axis x but with a misalignment where the misalignment area $ΔS_1$" and $ΔS_2$" are not equal. In this case the first and second electrode sections are rectangular instead of semicircular or squareshaped or similar. In any other aspect the functioning is the same as that described with reference to FIGS. 2 and 3 and the figure is merely included to explicitly illustrate that different shapes can be used.

Figure 6:
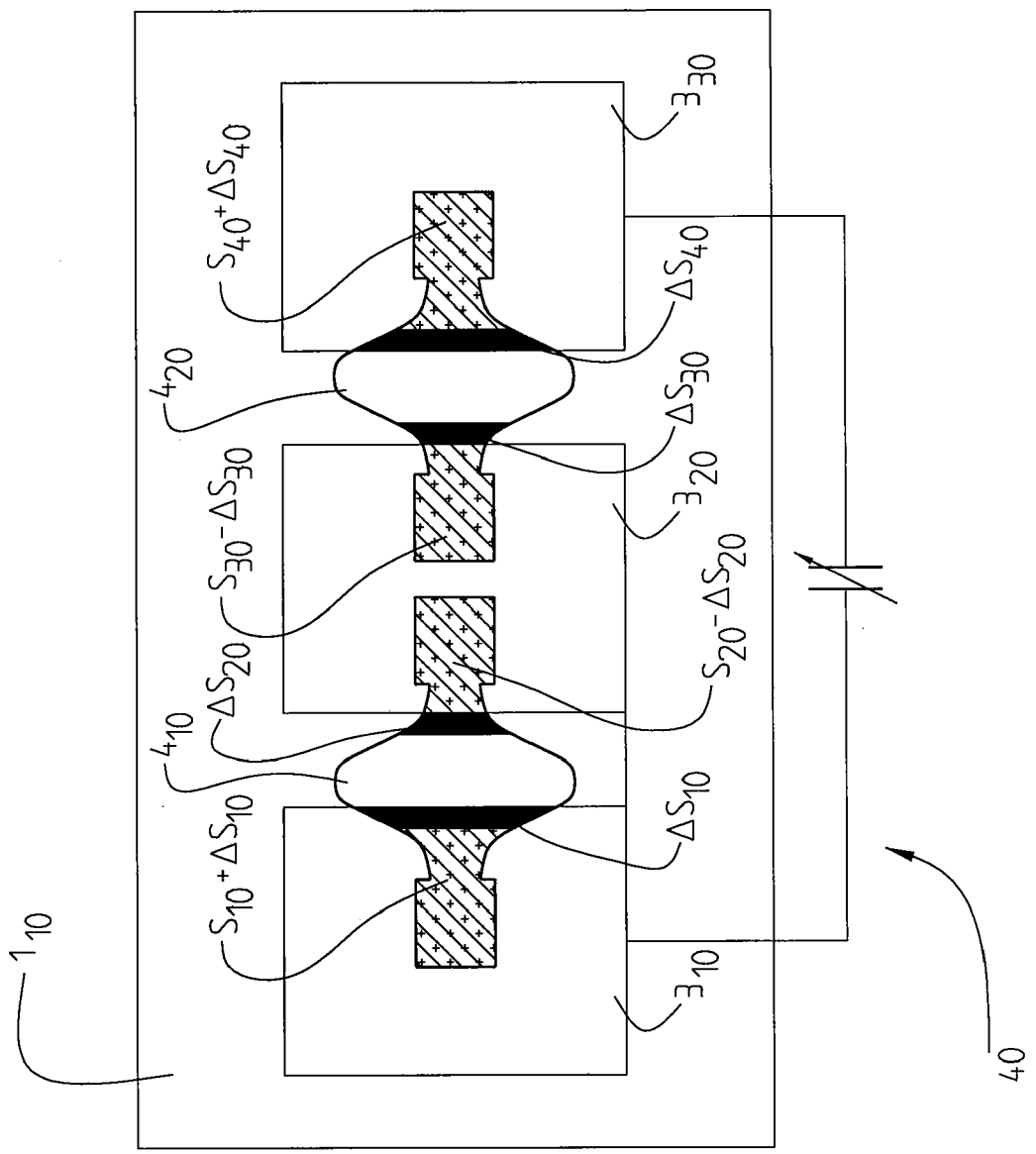

FIG. 6 very schematically shows a varactor arrangement 40 comprising two varactors $3_{10}$, $3_{20}$, $30_{30}$ connected in series. This means that two varactors, i.e. parallel-plate varactors, are disposed on a substrate $1_{10}$ with a dielectric or ferroelectric film arranged between first and second electrode means as discussed above. Due to a misalignment overlapping areas are given as $S_{10}+ΔS_{10}$; $S_{20}−ΔS_{20}$; $S_{30}−ΔS_{30}$ and $S_{40}+ΔS_{40}$ respectively. It should be clear that this figure is very schematical, the only intention thereof being to illustrate that several capacitors formed by first and second electrode means as discussed above, etc. can be used which are arranged to provide a misalignment invariable arrangement.

It should be clear that the invention can be varied in a number of ways within the scope of the appended claims.

What is claimed is:

1. A capacitance arrangement, comprising:
   at least one parallel-plate capacitor having:
   a first electrode means;
   a dielectric layer; and
   a second electrode means substantially in a parallel manner disposed on either side of said dielectric layer and partly overlapping each other;
   wherein the equivalent capacitance of the capacitance arrangement is dependent on the size of the overlapping area of said first and second electrode means and a misalignment limit defining the maximum allowable extent of misalignment between a respective first and second electrode means being given;
   wherein said first electrode means further comprises a first and a second electrode arranged symmetrically with respect to a longitudinal axis, that said first and second electrodes each have a respective first edge, which respective first edges face each other, are linear and parallel such that a gap is defined therebetween;
   wherein said second electrode means further comprises a third electrode, said third electrode having a first section and a second section disposed on opposite sides of said gap and interconnected by means of an intermediate section which is delimited by a first curved edge and a second curved edge which first and second curved edges are symmetrical and oppositely directed with respect to said longitudinal axis, and the shape of which being given by a function (F(x)) depending on a first parameter (k) and a second parameter (A) and in that one of said two parameters is adapted to be selected hence allowing calculation of the other parameter to determine the shape and size of the second electrode means such that the capacitance of the capacitance arrangement will be misalignment invariable within the misalignment limit.

2. The capacitance arrangement according to claim 1, wherein the first parameter (k) determines the shape or curvature of F(x) and in that the second parameter (A) is half the width (2A) of the second electrode means, being the third electrode.

3. The capacitance arrangement according to claim 2, wherein the first parameter (k) is adapted to be selected allowing calculation of the second parameter (A).

4. The capacitance arrangement according to claim 1, wherein the first and second electrodes have a shape and are arranged such that the overlapping area provides a predetermined capacitance independently of any misalignment (Δx) within the given misalignment limit ($Δx_A$) giving different overlaps of the first electrode means and the intermediate section on the side of the first section and of the second section.

5. The capacitance arrangement according to claim 1, wherein the capacitance between the first electrode and the third electrode is proportional to the sum of the overlap of the first electrode and the first section of the third electrode, the overlap between the first electrode and the intermediate section in absence of any misalignment, and a first misalignment overlap area (ΔS1), the first electrode and the intermediate section in the longitudinal direction limited by the maximum allowed misalignment ($\Delta x$), and in that the capacitance between the second electrode and the third electrode is proportional to the sum of the overlap area of the second electrode and the second section of the third electrode the overlap between the second electrode and the intermediate section in absence of any misalignment, and a second misalignment overlap area ($\Delta S2$) of the second electrode and the intermediate section in the opposite longitudinal direction limited by the maximum allowed misalignment, the first and the second misalignment overlap areas having opposite signs, i.e. if the first misalignment overlap area has a positive sign, the second has a negative sign or vice versa.

6. The capacitance arrangement according to claim 5, wherein the first and second parameters are selected and calculated respectively that the relationship between the first and the second misalignment overlap areas ($\Delta S1, \Delta S2$), or between corresponding first and second capacitance differences ($\Delta C1, \Delta C2$), are such that the equivalent capacitance of the arrangement is independent of any misalignment within the given misalignment limit.

7. The capacitance arrangement according to claim 6, wherein the first misalignment overlap area ($\Delta S1$) is equal to the overlapping area of a first or second electrode and a first or second electrode section of the second electrode means in absence of any misalignments (S1) divided by the quotient between said overlapping area and the second misalignment area (S1/$\Delta S2$) minus 2, i.e. $\Delta S1 = S1/((S1/\Delta S2)-2)$.

8. The capacitance arrangement according to claim 1, wherein the shape of the intermediate section is given by $F(x) = A \cdot e^{kx}$, 2A being the width of the second electrode means, i.e. twice the second parameter, and k being the first parameter defining the slope or curvature wherein $0 < x < 2\Delta x_A$, $\Delta x_A$ being the misalignment limit.

9. The capacitance arrangement according to claim 1, wherein half the width of the second electrode means is $A = -k \cdot S1/(e^{k \cdot Wg/2})$, S1 being the overlapping area of a first/second electrode and a first/second electrode section in absence of misalignment, Wg being the gap width and k being the first parameter determining the slope or curvature of the function delimiting the intermediate section.

10. The capacitance arrangement according to claim 1, wherein the first section and the second section are symmetrical.

11. The capacitance arrangement according to claim 10 wherein the first section and the second section are square shaped, rectangular, semicircular or partly irregular.

12. The capacitance arrangement according to claim 1, wherein the second electrode means comprises a bottom electrode and in that the first electrode means comprises a top electrode.

13. The capacitance arrangement according to claim 1, wherein the first or the second electrode means is disposed on a substrate.

14. The capacitance arrangement according to claim 1, wherein the dielectric material has a low dielectric constant consisting of $SiO_2$ or a material with similar properties.

15. The capacitance arrangement according to claim 1, further comprising a varactor arrangement.

16. The capacitance arrangement according to claim 15, wherein the dielectric layer comprises a ferroelectric layer with a tunable dielectric constant which is preferably high or very high.

17. The capacitance arrangement according to claim 15, wherein the dielectric layer comprises a tunable ceramic material, including $SrTiO_3$, Ba STO or a material with similar properties.

18. The capacitance arrangement according to claim 1, wherein the first and second electrode means is a metal selected from the group consisting of Au, Ag, Pt, and Cu.

19. The capacitance arrangement according to claim 1, wherein the wherein the dielectric layer comprises a thin film ferroelectric material.

20. The capacitance arrangement according to claim 1, wherein the dielectric layer comprises a thick film ferroelectric layer.

21. The capacitance arrangement according to claim 1, further comprising a number of parallel plate capacitors or varactors connected in series.

22. A method for producing a capacitance arrangement comprising at least one parallel-plate capacitor having a first electrode means, a dielectric layer and a second electrode means wherein said first and second electrode means partly overlap each other, the size of the overlapping area giving the equivalent capacitance of the arrangement and wherein further an allowable misalignment limit is given defining the maximum allowable extent of misalignment between a respective first and second electrode means, comprising the steps of:
 establishing an equivalent capacitance to be provided;
 determining an allowable misalignment limit; and
 designing a first electrode means comprising two substantially symmetrical electrodes with two respective first edges facing each other, being linear, parallel and adapted to be arranged symmetrically on a longitudinal axis such that a gap is formed between them, and a second electrode means comprising a third electrode comprising a first and a second section located on opposite sides of said gap and interconnected by means of an intermediate section, by finding a function $F(x)$, said function $F(x)$ and said function $F(x)$ mirrored in said longitudinal axis ($-F(x)$) determining the shape of said intermediate section on the opposite sides of said longitudinal axis such that the equivalent capacitance will be misalignment invariable within the given misalignment limit.

23. The method according to claim 22, wherein the function $F(x)$ further depends on two parameters one of which being the width (2A) of the intermediate section, the other being the slope (k) of the function $F(x)$, and in that the method further comprises the steps of:
 selecting the value of one of said parameters; and
 calculating the value of the other of said parameters using the selected parameter value.

24. The method according to claim 23, wherein the function $F(x)$ is given by $F(x) = Ae^{kx}$ and in that the method further comprises the steps of:
 selecting the width ($w_g$) of the gap;
 selecting k;
 finding the overlapping area (S1) in absence of misalignment of the first and second electrode means and the first, second and third sections of the second electrode means respectively such that the desired equivalent capacitance is obtained; and
 calculating A as $A = -k \cdot S1/e^{k \cdot Wg/2}$.

25. The method according to claim 22, further comprising the step of disposing the first and second electrode means on either sides of a dielectric layer.

26. The method according to claim 22, further comprising the step of disposing the first and second electrode means on either sides of a ferroelectric layer with a variable dielectric constant to provide a varactor arrangement.

27. The method according to claim 26, further comprising the step of using a photolithographic process to fabricate the capacitor or varactor arrangement.

* * * * *

UNITED STATES PATENT AND TRADEMARK OFFICE
CERTIFICATE OF CORRECTION

PATENT NO. : 8,009,406 B2
APPLICATION NO. : 12/444819
DATED : August 30, 2011
INVENTOR(S) : Gevorgyan et al.

It is certified that error appears in the above-identified patent and that said Letters Patent is hereby corrected as shown below:

In Column 2, Line 12, delete "$(3_{05})$" and insert -- $(3_{05'})$ --, therefor.

In Column 3, Line 19, delete "A" and insert -- (A) --, therefor.

In Column 5, Line 64, delete "33" and insert -- $3_3$ --, therefor.

In Column 9, Line 35, in Claim 8, delete "O<x<$2\Delta x_A$," and insert -- 0<x<$2\Delta x_A$, --, therefor.

In Column 10, Line 5, in Claim 19, delete "wherein the wherein the" and insert -- wherein the --, therefor.

Signed and Sealed this
Twenty-eighth Day of February, 2012

David J. Kappos
*Director of the United States Patent and Trademark Office*